(12) United States Patent
Brown et al.

(10) Patent No.: US 8,407,928 B2
(45) Date of Patent: Apr. 2, 2013

(54) FISHING HOOK RETAINING APPARATUS

(76) Inventors: James Mikel Brown, Mesa, AZ (US);
John Eldo Brown, Phoenix, AZ (US)

( * ) Notice: Subject to any disclaimer, the term of this patent is extended or adjusted under 35 U.S.C. 154(b) by 764 days.

(21) Appl. No.: 12/575,758

(22) Filed: Oct. 8, 2009

(65) Prior Publication Data
US 2010/0083558 A1    Apr. 8, 2010

Related U.S. Application Data

(60) Provisional application No. 61/195,590, filed on Oct. 8, 2008.

(51) Int. Cl.
*A01K 87/00* (2006.01)
(52) U.S. Cl. .......................................................... 43/25.2
(58) Field of Classification Search ..................... 43/25.2
See application file for complete search history.

(56) References Cited

U.S. PATENT DOCUMENTS

| | | | |
|---|---|---|---|
| 1,662,983 A | 3/1928 | Pflueger | |
| 2,556,403 A | 6/1951 | Sokolik | |
| 2,767,502 A * | 10/1956 | Reynolds | 43/25.2 |
| 3,484,980 A * | 12/1969 | Wait | 43/25.2 |
| D217,663 S * | 5/1970 | Chamberlain | D22/134 |
| 3,815,273 A | 6/1974 | Perkins | |
| 3,839,811 A | 10/1974 | Hopkins | |
| 3,971,151 A | 7/1976 | Banner | |
| 5,199,208 A | 4/1993 | Matchette | |
| 5,220,742 A | 6/1993 | Lewis | |
| 5,232,775 A * | 8/1993 | Chamberlain et al. | 428/323 |
| 5,383,695 A | 1/1995 | Couper | |
| 5,787,635 A | 8/1998 | Lin et al. | |
| 5,875,582 A | 3/1999 | Ratzlaff et al. | |
| 6,126,157 A | 10/2000 | Rutzer | |
| 6,434,878 B1 | 8/2002 | Milton | |
| 6,474,013 B2 * | 11/2002 | Terry | 43/57.1 |
| D475,432 S * | 6/2003 | LaLande | D22/126 |
| 7,152,359 B1 | 12/2006 | Adams | |
| 7,152,364 B1 | 12/2006 | Repine | |
| 7,168,202 B2 | 1/2007 | Kohler | |
| 7,299,583 B2 | 11/2007 | Adams | |
| D586,876 S * | 2/2009 | Kern | D22/134 |
| 2002/0116861 A1 | 8/2002 | Stockdale | |
| 2006/0048438 A1 | 3/2006 | Kohler | |
| 2006/0277815 A1 | 12/2006 | Adams | |
| 2007/0056204 A1 | 3/2007 | Adams | |
| 2008/0244956 A1 | 10/2008 | Gant et al. | |

* cited by examiner

*Primary Examiner* — Christopher P Ellis
(74) *Attorney, Agent, or Firm* — Schmeiser, Olsen & Watts LLP

(57) ABSTRACT

A fishing hook retaining apparatus is provided. In a first aspect, a first member and a second member of the fishing hook retaining apparatus oppose one another and pivotally rotate about a shaft from a closed position to an open position when compressive force is applied to lower portions of the first and second members. While open, an operator may insert a fishing hook into the fishing hook retaining device and subsequently release the applied force to permit the first and second members to close and thus secure the fishing hook within the fishing hook retaining device. In a second aspect, when in the closed position, the first and second members not only secure the fishing hook therewithin, but compressively grip a cylindrical rod placed therebetween, which secures the fishing hook retaining apparatus to the cylindrical rod, wherein the cylindrical rod is a fishing pole.

15 Claims, 11 Drawing Sheets

FISHING HOOK RETAINING APPARATUS

CROSS REFERENCE TO RELATED APPLICATION

This application claims priority to U.S. Provisional Patent Application to Brown et al. entitled "Fishing Hook Retaining Apparatus," Ser. No. 61/195,590, filed Oct. 8, 2008, the disclosure of which is hereby incorporated entirely herein by reference.

BACKGROUND OF THE INVENTION

1. Technical Field

This invention relates generally to fishing hook retaining apparatuses and more particularly to fishing hook retaining apparatuses that provide for the safe and secure retention and storage of fishing hooks and fishing lures.

2. State of the Art

The safe and secure storage of fishing hooks and fishing lures while not in use has long been a common problem for fisherman of all ages and experience. When a fishing hook or fishing lure attached to a fishing line is not in use, either during an extended period between fishing outings or during a pause in fishing to change fishing locations or fishing lures, it is common for fisherman to secure the fishing hooks and/or fishing lures to the fishing rod by securing the hook or lure to the fishing rod itself. However, it is well-known that securing the hook or lure to the fishing rod in this manner does not always prevent the hook from unexpectedly snagging on objects or persons.

There is thus a need for the safe and secure retention and storage of fishing hooks and fishing lures. The present invention satisfies these needs, in addition to other related advantages.

SUMMARY OF THE INVENTION

It is one object of the present invention to provide the safe and secure retention and storage of hooks, and in particular fishing hooks and fishing lures.

In accordance with one embodiment of the present invention, a hook retaining apparatus is provided. The hook retaining apparatus comprises a first member having a top edge; a second member opposing the first member, the second member having a top edge; a shaft around which the first and second members pivotally rotate between an open position and a closed position; and notches in the first and second members, the notches being structured to receive a cylindrical rod, wherein, in the open position, the top edge of the first member and the top edge of the second member are separated by a distance sufficient to receive a barb and point of a hook, and, in the closed position, the top edge of the first member and the top edge of the second member are structured to grip a shank of the hook as the notches grip the cylindrical rod.

The hook retaining apparatus further comprises an inner surface of the first member; an inner surface of the second member; and a hollow between the inner surfaces of the first and second members defined by the first and second members being in the closed position, wherein the hollow is structured to allow the barb and point of the hook to be positioned therein.

The hook retaining apparatus further comprises an elastic member positioned between the first and second members, wherein the elastic member is structured to maintain the first and second members in the closed position and to permit the first and second members to pivotally rotate to the open position under the condition that force is applied to the first and second members to compress the elastic member.

The hook retaining apparatus further comprises an outside surface of the first and second members; an opening in the outside surface of each of the first and second members, the opening completely penetrating through each of the first and second members, respectively, wherein the opening in the first and second members is structured to receive the barb and point of the hook; and a grip surface, wherein the grip surface is positioned on the outside surface of the first and second members and is structured to facilitate applying force to move the first and second members to the open position.

The hook retaining apparatus further comprises a friction material positioned in the notches, the friction material being structured to increase the grip of the first and second members on the cylindrical rod.

The hook retaining apparatus further comprises a first member front sidewall and a first member rear sidewall, the first member front sidewall and the first member rear sidewall being positioned on opposing ends of the first member; and a second member front sidewall and a second member rear sidewall, the second member front sidewall and the second member rear sidewall being positioned on opposing ends of the second member, wherein the notches are formed in the first member front and rear sidewalls and in the second member front and rear sidewalls, and the notches in the first member align with the notches in the second member.

The hook retaining apparatus further comprises a depression on the inner surface of each of the first and second members; and a magnet positioned in the depression to secure the barb and point of the hook in the hollow.

The hook retaining apparatus further comprises first member shaft extensions projecting substantially perpendicular from the inner surface of the first member and structured to support opposing ends of the shaft; and second member shaft extensions projecting substantially perpendicular from the inner surface of the second member and structured to support the opposing ends of the shaft, wherein the first member shaft extensions align with the second member shaft extensions.

The hook retaining apparatus further comprises a first member inner wall positioned between the first member front and rear sidewalls, the first member inner wall projecting substantially perpendicular from an inner surface of the first member and extending substantially parallel with the first member front and rear sidewalls; and a second member inner wall positioned between the second member front and rear sidewalls, the second member inner wall projecting substantially perpendicular from an inner surface of the second member and extending substantially parallel with the second member front and rear sidewalls, wherein the first member inner wall aligns with the second member inner wall.

The hook retaining apparatus further comprises secondary notches in the first member inner wall and the second member inner wall, wherein the secondary notch in the first member inner wall aligns with the secondary notch in the second member inner wall, and wherein the secondary notches in the first and second member inner walls align with the notches in the first member front and rear sidewalls and the second member front and rear sidewalls.

In accordance with another embodiment of the present invention, a hook retaining apparatus is provided. The hook retaining apparatus comprises a first member; a second member opposing the first member; a shaft around which the first and second members pivotally rotate between an open position and a closed position; an indentation in the first and second members, the indentation being structured to receive a shank of a hook; and a plurality of notches in the first and second members, the notches being structured to receive a cylindrical rod, wherein, under the condition that the first and second members are in the closed position, the notches grip the cylindrical rod as the indentations retain the shank.

The hook retaining apparatus further comprises an inner surface of the first member; an inner surface of the second member; and a hollow between the inner surfaces of the first and second members defined by the first and second members being in the closed position, wherein the hollow is structured to allow a barb and point of the hook to be positioned therein.

The hook retaining apparatus further comprises an elastic member positioned between the first and second members, wherein the elastic member is structured to maintain the first and second members in the closed position and to permit the first and second members to pivotally rotate to the open position under the condition that force is applied to the first and second members to compress the elastic member.

The hook retaining apparatus further comprises an outside surface of the first and second members; an opening in the outside surface of each of the first and second members, the opening completely penetrating through each of the first and second members, respectively, wherein the opening in the first and second members is structured to receive the barb and point of the hook; and a grip surface, wherein the grip surface is positioned on the outside surface of the first and second members and is structured to facilitate applying force to move the first and second members to the open position.

The hook retaining apparatus further comprises a friction material positioned in the notches, the friction material structured to increase the grip of the first and second members on the cylindrical rod.

The hook retaining apparatus further comprises a first member front sidewall and a first member rear sidewall, the first member front sidewall and the first member rear sidewall being positioned on opposing ends of the first member; and a second member front sidewall and a second member rear sidewall, the second member front sidewall and the second member rear sidewall being positioned on opposing ends of the second member, wherein the plurality of notches are formed in the first member front and rear sidewalls and the second member front and rear sidewalls.

The hook retaining apparatus further comprises the plurality of notches on the first member front sidewall being aligned with the plurality of notches on the first member rear sidewall, and the plurality of notches on the second member front sidewall being aligned with the plurality of notches on the second member rear sidewall, and wherein the notches on the first member align with the notches on the second member.

The hook retaining apparatus further comprises a first member top sidewall positioned between the first member front sidewall and the first member rear sidewall; and a second member top sidewall positioned between the second member front sidewall and the second member rear sidewall, wherein the first member top sidewall aligns with the second member top sidewall and the indentations are formed on the first and second member top sidewalls.

The hook retaining apparatus further comprises a depression on the inner surface of each of the first and second members; and a magnet positioned in the depression to secure the barb and point of the hook in the hollow.

The hook retaining apparatus further comprises first member shaft extensions projecting substantially perpendicular from the inner surface of the first member and structured to support opposing ends of the shaft; and second member shaft extensions projecting substantially perpendicular from the inner surface of the second member and structured to support the opposing ends of the shaft, wherein the first member shaft extensions align with the second member shaft extensions.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to the safe and secure retention and storage of hooks, in particular fishing hooks and fishing lures.

Figure 1:
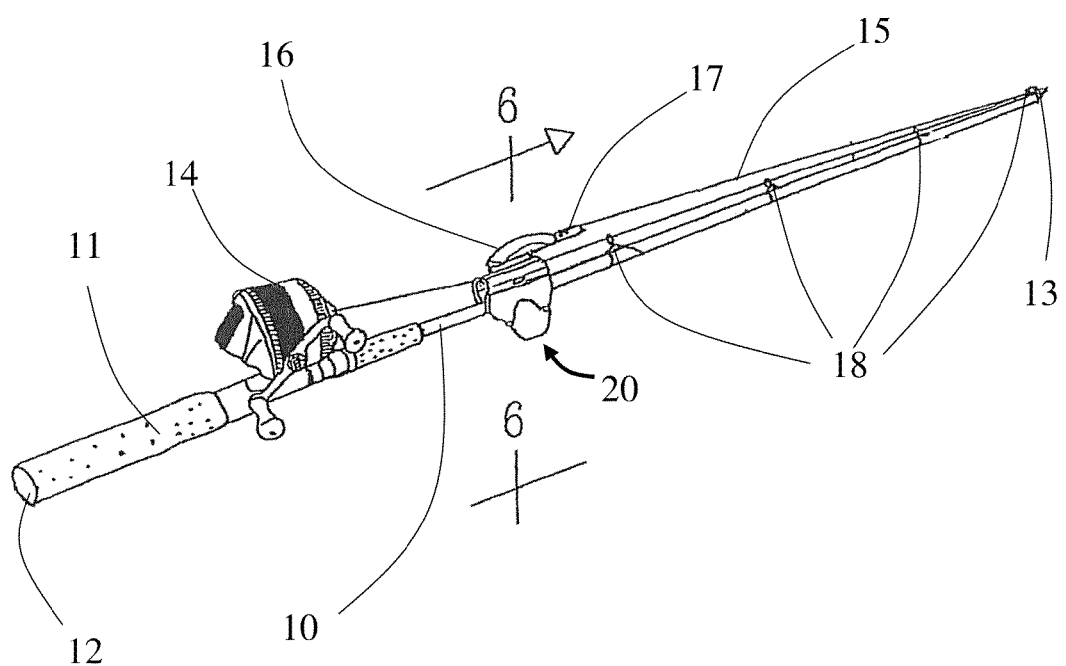
FIG. 1 is a perspective view of the present invention as it would appear in use.

As shown in FIG. 1, particular embodiments of the present invention include a fishing pole 10. Fishing pole 10 includes a cylindrical gripping surface 11 extending between first longitudinal end 12 and second longitudinal end 13. Attached to the fishing pole 10 is fishing reel 14. Extending longitudinally from fishing reel 14 is fishing line 15 that pierces eyelets 18 and terminates at fishing lure 16. The fishing line 15 is fastened to eyelet 17 on the fishing lure 16. The fishing lure 16 includes one or more fishing hooks (not shown) that are secured within fishing hook retaining apparatus 20, which fastens to fishing pole 10, as described below.

It will be appreciated by one of ordinary skill in the art that the hook on the fishing lure 16 may be a single hook, a treble hook, or any number of or combination of hooks and treble hooks. The hook may be of various shapes and sizes, but a typical fishing hook comprises an eyelet through which a fishing line attaches to the fishing hook. Also, a typical fishing hook also comprises a shaft extending from the eyelet to a bend in the fishing hook, and the bend extends to the end of the hook, which consists of the point and barb of the hook. As used within the specification, the hook comprises at least an eyelet, a shank, a bend, and a point and barb, as discussed above.

Figure 2:
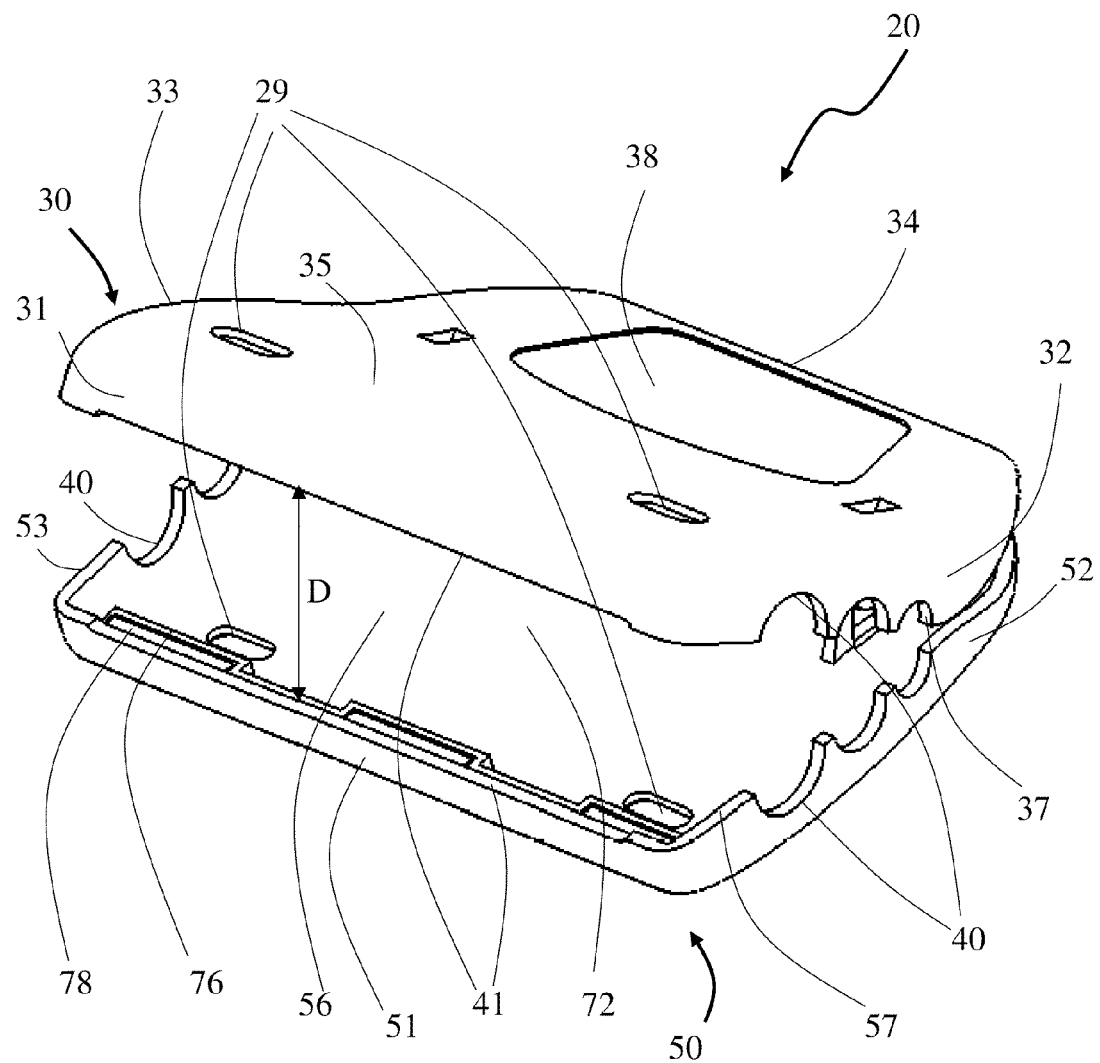
FIG. 2 is a an enlarged top-side horizontal perspective view of one embodiment of the present invention in the open position.

As shown in FIG. 2, fishing hook retaining apparatus 20 includes first member 30 having a top sidewall 31, a front sidewall 32, a rear sidewall 33, a lower sidewall 34, an outer surface 35, and an inner surface 36 (not shown in FIG. 2). Fishing hook retaining apparatus 20 also includes second member 50 having a top sidewall 51, a front sidewall 52, a rear sidewall 53, a lower sidewall 54 (not shown in FIG. 2), an outer surface 55 (not shown in FIG. 2), and an inner surface 56. The top sidewall 31 of the first member 30 is aligned with the top sidewall 51 of the second member 50, and the front and rear sidewalls 32 and 33 of the first member 30 are aligned with the front and rear sidewalls 52 and 53, respectively, of the second member 50. Such orientation facilitates the operation of the fishing hook retaining apparatus 20.

The top sidewall 51, the front sidewall 52, the rear sidewall 53, and the lower sidewall 54 of the second member 50 further include a flat edge portion 57 that runs along the length of the top sidewall 51, the front sidewall 52, the rear sidewall 53, and the lower sidewall 54. Although not shown in FIG. 2, the top sidewall 31, the front sidewall 32, the rear sidewall 33, and the lower sidewall 34 of the first member 30 further include a flat edge portion 37 that runs along the length of the top sidewall 31, the front sidewall 32, the rear sidewall 33, and the lower sidewall 34.

The first member 30 includes notches 40 located on the flat edge portions 37 of each of the front sidewall 32 and rear sidewall 33 (not shown). The first member 30 further includes indentation 41 positioned on the flat edge portion 37 of the top sidewall 31. Similarly, the second member 50 includes the notches 40 positioned on the flat edge portions 57 of each of the front sidewall 52 and the rear sidewall 53. The second member further includes the indentation 41 positioned on the flat edge portion 57 of the top sidewall 51.

The notches 40 in the front sidewall 32 and the rear sidewall 33 of the first member 30 may be aligned with each other, and the notches 40 in the front sidewall 52 and the rear sidewall 53 of the second member 50 may be aligned with each other. Moreover, the notches 40 in the first member 30 may be aligned with the notches 40 in the second member 50. Similarly, the indentations 41 in the top sidewall 31 and the top sidewall 51 may be aligned with one another. The notches 40 are further structured to grip a cylindrical rod when the fishing hook retaining apparatus is placed in the closed position. As such, the notches 40 are semicircular in shape. However, the notches 40 may also be of any shape or size sufficient to grip a cylindrical rod. Further, the notches 40 can be of differing size to accommodate cylindrical rods of various sizes. In addition, a friction material 90 with enhanced frictional capabilities may be placed within the notches 40 to increase the grip of the notches on the cylindrical rods placed therein.

The notches 40 may also be positioned in the front and rear sidewalls 32 and 33 at a point in the front and rear sidewalls 32 and 33 where the front and rear sidewalls 32 and 33 are substantially perpendicular to the top sidewalls 31 and 51.

The outer surface 35 of the first member 30 further includes a grip surface 38 for facilitating the movement of the fishing hook retaining device 20 from a closed position to an open position, or vice versa, as will be described in greater detail below. The grip surface 38 may be comprised of rubber or a textured plastic to increase the friction between, for example, an operator's fingers and the grip surface 38. The grip surface may further be comprised of textured plastic in the shape and appearance of the scales of a fish. Moreover, it will be apparent to those of ordinary skill in the art that the grip surface 38 can be comprised of any surface, material, or texture that increases the friction between, for example, an operator and the grip surface 37. Although not shown in FIG. 2, the outer surface 55 of the second member 50 further includes a grip surface 58 of similar size, shape and configuration to that of the grip surface 38 as described above.

Figure 3:
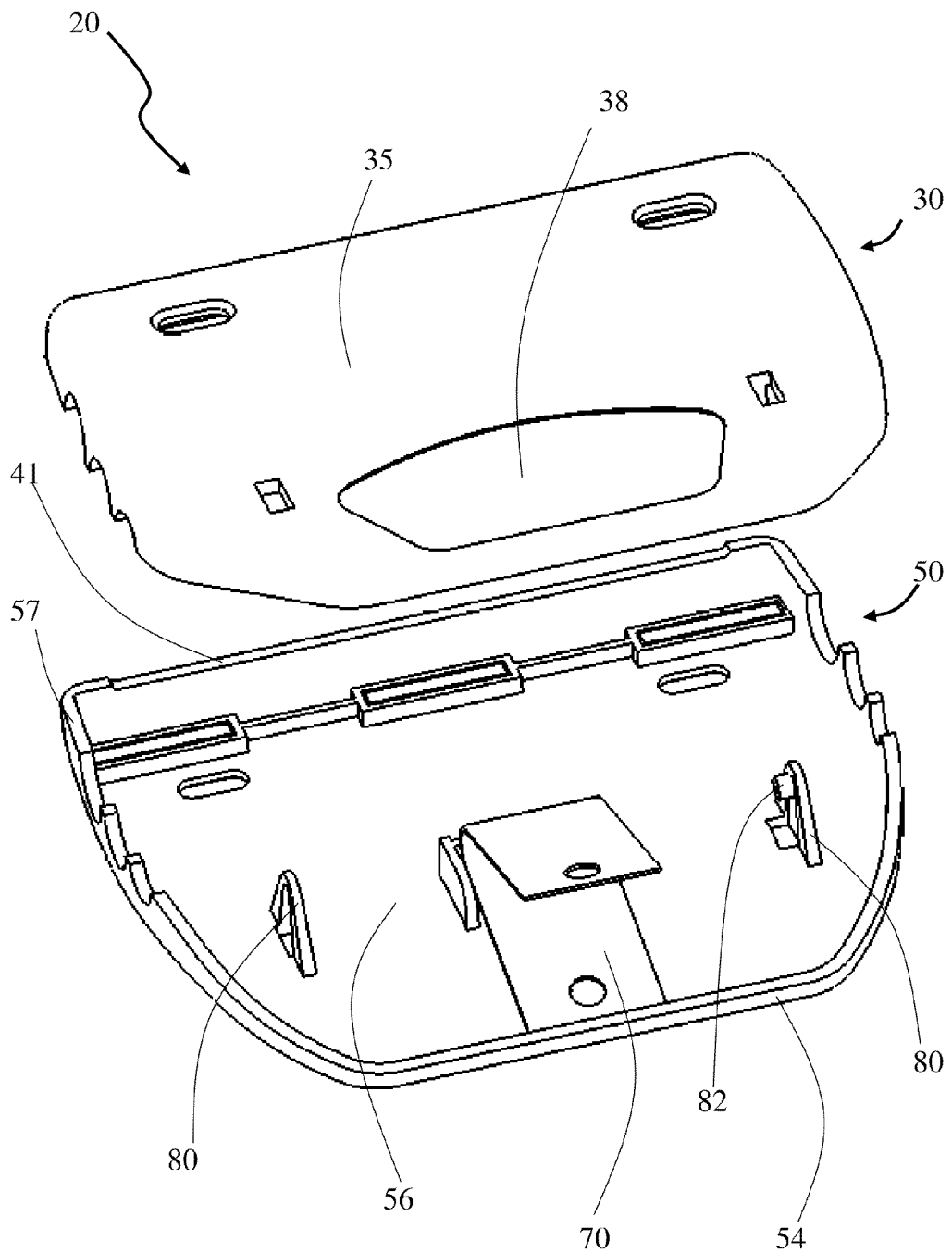
FIG. 3 is an exploded perspective view.
Figure 6:
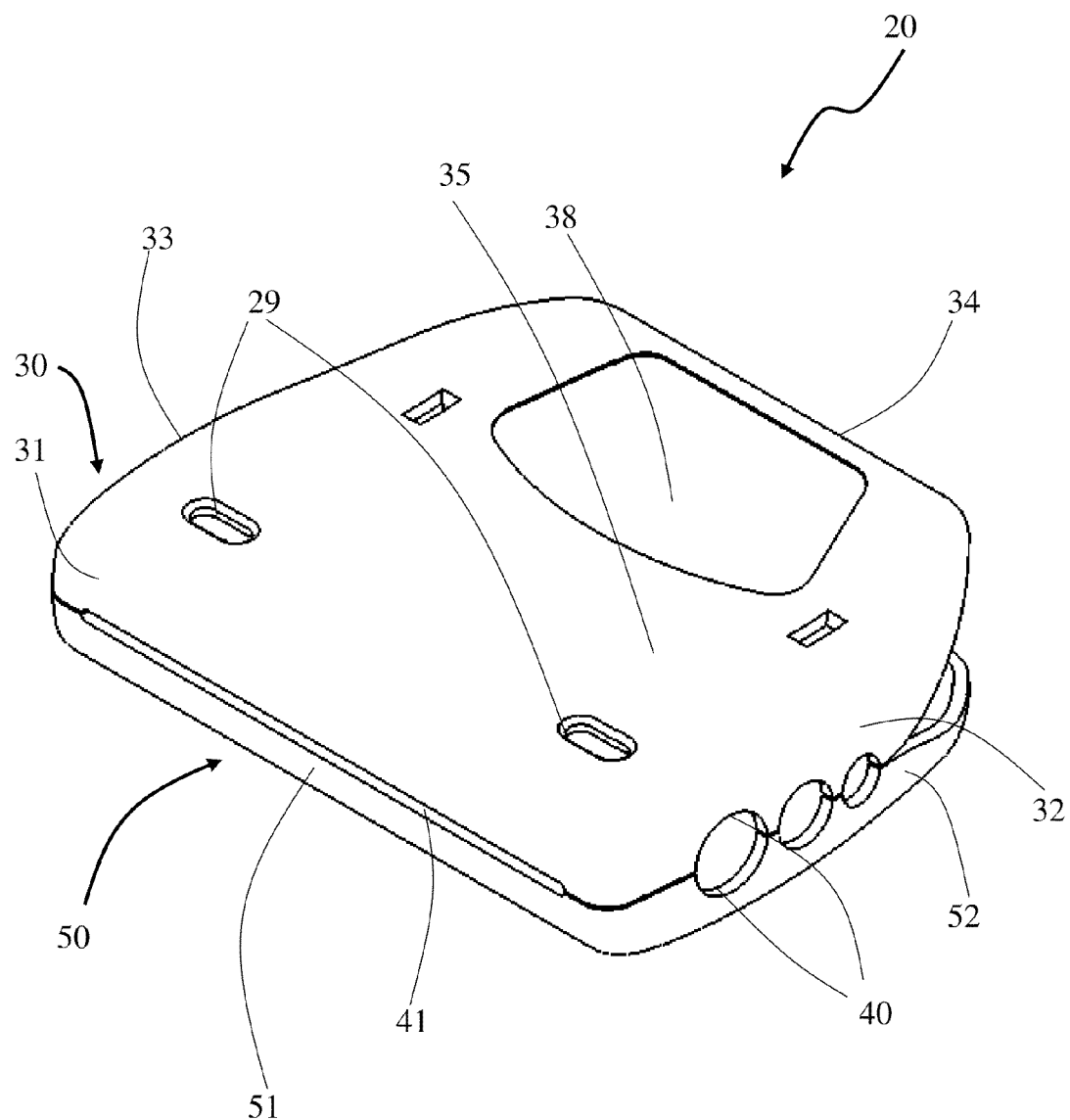
FIG. 6 is a top-side horizontal perspective view of the present invention in the closed position.
Figure 10:
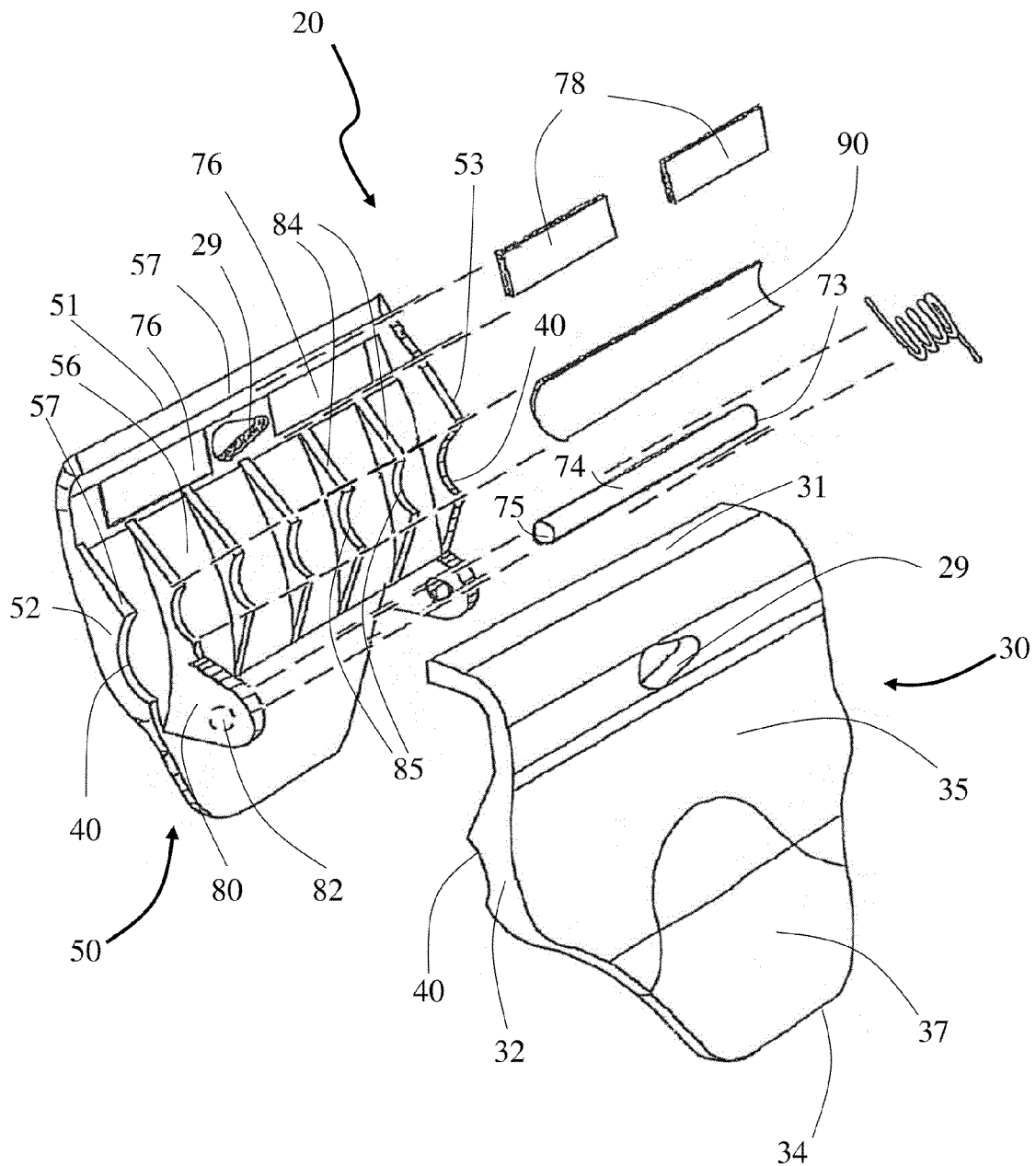
FIG. 10 is an exploded perspective view.

The outer surface 35 of first member 30 further includes openings 29 that pass completely through the outer surface 35 and the inner surface 36 of the first member 30. Similarly, the outer surface 55 of the second member 50 also includes the openings 29 that pass completely through the outer surface 55 and the inner surface 56 of the second member 50. The openings 29 are positioned in the outer surfaces 35 and 55 and positioned nearer to the top sidewalls 31 and 51 than the rear sidewalls 33 and 53. The openings 29 may be oval-like in shape. However, the openings 29 may be arrow-like in shape, with the openings 29 tapering from a larger open end to a smaller open end. The larger open end faces the front sidewalls 32 and 52 and the smaller open end faces the rear sidewalls 33 and 53. Nevertheless, the openings 29 are of sufficient size and shape to receive the fishing hook, where the barb and point of the fishing hook may be placed inside the openings 29 to secure the fishing hook to the fishing hook retaining apparatus 20, if desired. By placing at least the barb and point of the fishing hook within the openings 29, the barb and point are prevented from inadvertently catching on objects and persons near the fishing hook retaining apparatus 20. When the barb and point of the fishing hook are placed within the opening 29, the bend of the fishing hook rests against As shown in FIG. 3, an elastic member 70, such as a sheet metal spring, as shown in FIG. 3, or a coil spring, as shown in FIG. 10, is positioned between the first member 30 and the second member 50. The elastic member 70 is secured to the first member 30 and the second member 50 to maintain the fishing hook retaining apparatus 20 in the closed position under normal conditions. On the other hand, the fishing hook retaining apparatus 20 can be moved from a closed position, as shown in FIG. 6, to an open position, as shown in FIG. 2, by applying compressive force to the grip surfaces 38 and 58, or to any area surrounding the grip surfaces 38 and 58 to compress the elastic member 70 and separate the top sidewall 31 from the top sidewall 51. Once in the open position, the top sidewall 31 and the top sidewall 51 are separated a distance D, as shown in FIG. 2, from each other so as to permit the point and barb of a fishing hook to be inserted within the fishing hook retaining apparatus 20. Once inside the fishing hook retaining apparatus 20, the compressive force on gripping surfaces 38 and 58 may be released to allow the elastic member 70 to release to its normal configuration and thus close the fishing hook retaining apparatus 20 over the barb and point of the fishing hook.

It will be appreciated by one of ordinary skill in the art that the elastic member 70 may comprise a plurality of elastic members, such as springs or any combination of springs working in tandem, to maintain the fishing hook retaining apparatus 20 in the closed position under normal conditions and to allow the fishing hook retaining apparatus 20 to be moved from the closed position to the open position by applying compressive force to the grip surfaces 38 and 58, or to any area surrounding the grip surfaces 38 and 58.

Figure 4:
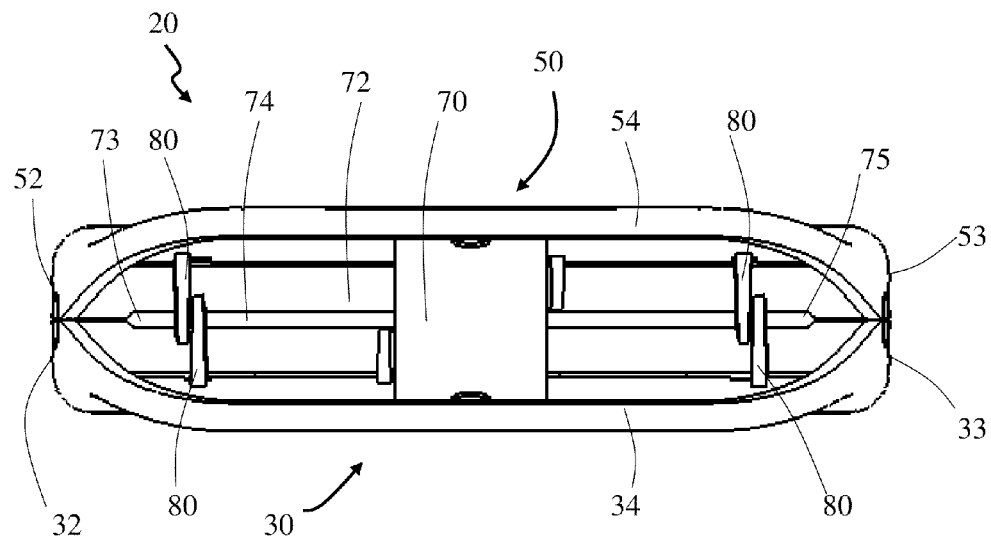
FIG. 4 is a bottom-side horizontal sectional view.
Figure 5:
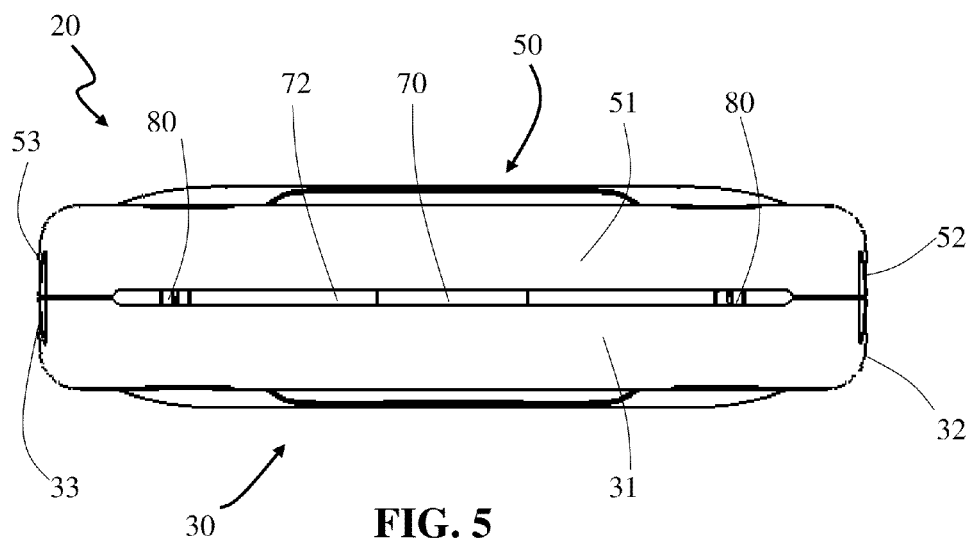
FIG. 5 is a top-side horizontal sectional view.

As shown in FIGS. 2, 4 and 5 first member 30 and second member 50 define therebetween an open space, or hollow 72, wherein the barb and point of a fishing hook may be inserted for either long-term or short-term storage. Specifically, the hollow 72 is defined by the open space between the inner surface 36 of the first member 30 and the inner surface 56 of the second member 50, as well as the open space between the front and rear sidewalls 32 and 33 of the first member 30 and the open space between the front and rear sidewalls 52 and 53 of the second member 50. The hollow 72 is of sufficient dimensions to allow variously configured hooks, including, hooks with multiple barbs and points, multiple hooks, or multiple hooks with multiple barbs and points, to be placed therein and securely retained.

As shown in FIGS. 2 and 3, the inner surface 56 of the second member 50 further includes inner depressions 76 that are structured to retain magnets 78 therein. The inner depressions are positioned on the inner surface 56 near the top sidewall 51 and the openings 29. Indeed, the inner depressions 76 and the magnets 78 placed therein may be positioned between the top sidewall 56 and the openings 29. The magnets 78 assist in retaining the hooks that have been placed in the hollow 72 and keeping the hooks from moving about within the hollow 72. The inner depressions 76 may be spaced evenly apart in a row or column, as shown, or the inner depressions 76 may be spaced in a staggered configuration. Moreover, the inner depressions 76 may comprise of a series of depressions or may alternatively comprise a single depression. The magnets 78 are of sufficient size and strength to attract and retain the fishing hooks that are placed within the hollow 72. The magnets may occupy the entire inner depressions 76, as shown, or may alternatively occupy only a portion of each of the inner depressions 76.

Similar to the inner surface 56 of the second member 50, the inner surface 36 of the first member 30 further includes inner depressions 76 as described above. Thus, a detailed explanation of the inner depressions 76 on the inner surface 36 of the first member 30 will not be repeated, as one of ordinary skill in the art will understand the configuration of the inner depressions 76 and corresponding magnets 78 from the description above.

Alternatively, the magnets 78 may be placed directly on the inner surfaces 36 and 56 of the first and second members 30 and 50, respectively, without being placed in the inner depressions 76. Each of the magnets 78 has a length and a width, wherein the length of the magnets runs parallel with the top sidewall 31 and the top sidewall 51. The magnets 78 may align with the openings 29 in a single line, or may also be offset from the openings 29 in a staggered formation to increase the likelihood that a hook placed within the fishing hook retaining apparatus 20 will be secured to at least one of the magnets 78.

As shown in FIGS. 3 and 4, the inner surfaces 36 and 56 of the first and second members 30 and 50, respectively, further include shaft extensions 80 that protrude substantially perpendicularly from the inner surfaces 36 and 56 and support a cylindrical shaft 74. Shaft 74 provides an axis of rotation, around which first member 30 and second member 50 pivotally cylindrically rotate between the open and closed positions. The shaft extensions 80 further include hollow cylindrical portions 82 that support opposing ends 73 and 75 of the shaft 74 and allow opposing ends 73 and 75 to pass through and extend beyond the shaft extensions 80. Alternatively, either the shaft extensions 80 can be repositioned or the shaft 74 can be shortened so that opposing ends 73 and 75 of the shaft 74 terminate at the shaft extensions 80. As shown in FIG. 4, the shaft extensions 80 on the inner surfaces 36 are aligned with the shaft extensions 80 on the inner surface 56 along a longitudinal direction of the shaft 74.

As shown in FIG. 5, when the first and second members 30 and 50 are placed in the closed position, the indentations 41 in first and second members 30 and 50, respectively, together form a groove wherein a shank of the hook may be feasibly retained. Moreover, the groove formed by the indentations 41 may retain the fishing line 15 when the entire hook or the fishing lure 16 is placed in the hollow 72. Through the indentations 41, the hollow 72, within the first and second members 30 and 50, can readily be seen. In addition, the shaft extensions 80 and the elastic member 70 are viewable.

As shown in FIG. 6, under the condition that no compressive force is exerted on either the first member 30 or the second member 50 to compress the elastic member 70 (not shown), the fishing hook retaining device 20 rests in the closed position.

Figure 7:
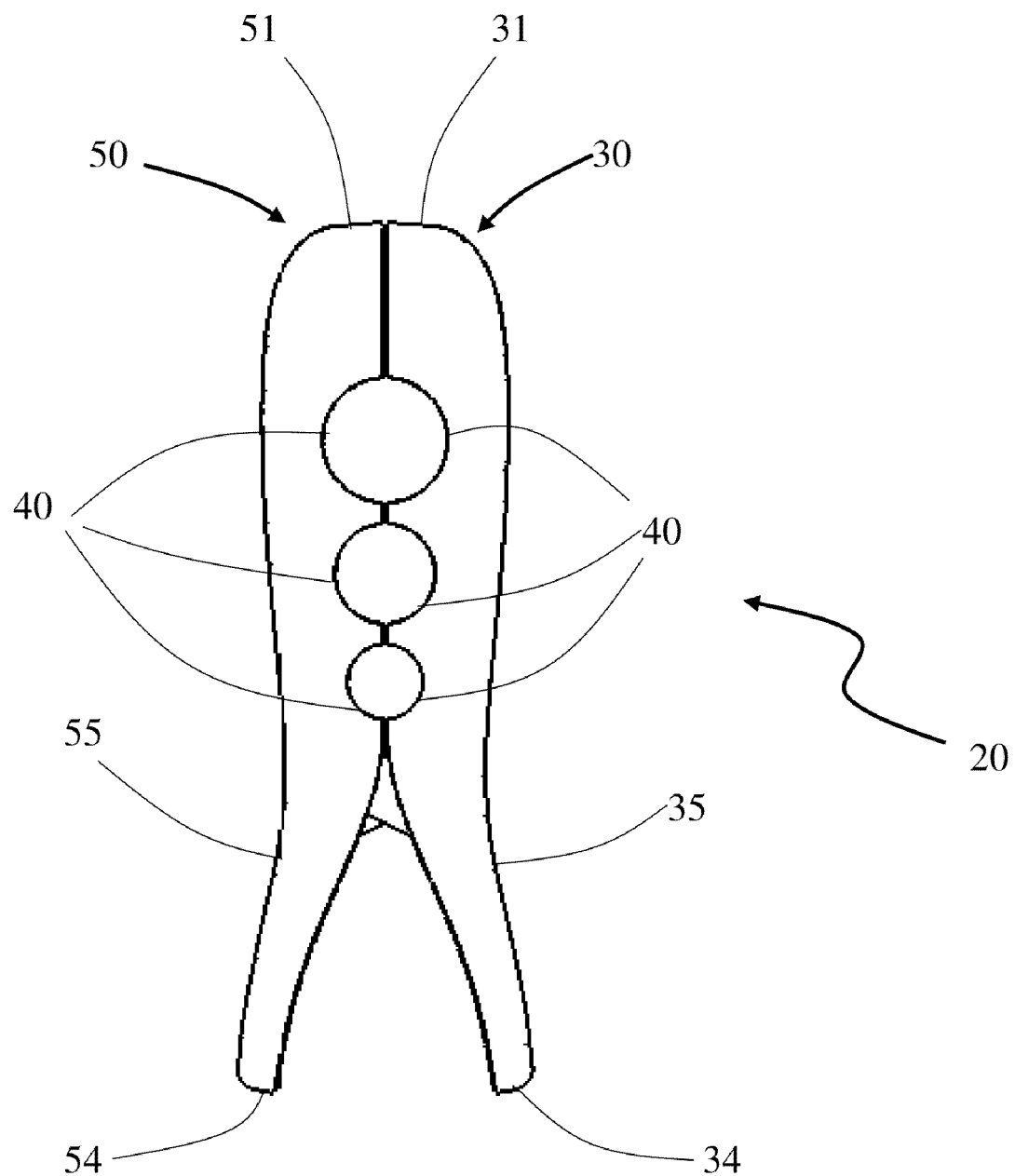
FIG. 7 is a vertical sectional view.

As shown in FIG. 7, the outer surface 35 of the first member 30 and the outer surface of the second member 50 have a curvilinear shape. The curvilinear shape assists the operator in applying compressive force to the first and second members 30 and 50 to move the fishing hook retaining apparatus from the closed position, as shown, to the open position of FIG. 2.

With the above-described configuration, an operator may apply compressive force to the first and second members 30 and 50 to move the fishing hook retaining apparatus 20 from a closed position to an open position. Once in the open position, the operator may place any number of hooks inside the hollow 72. Inside the hollow 72, the barbs and points of the hooks will come into contact with the magnets 78, thus securing the hooks inside the hollow 72. The operator may then release the compressive force applied to the first and second members 30 and 50 to close the first and second members 30 and 50 around the shanks of the hooks or around the fishing line connected to the hooks. Alternatively, the operator may simply insert the barb and point of the hook into the openings 29 in the first and second members 30 and 50 to retain the hook on the fishing hook retaining apparatus 20.

Another particular embodiment of the present invention will be described below in detail. Portions of the description that are consistent with the above-described embodiment need not be repeated.

Figure 8:
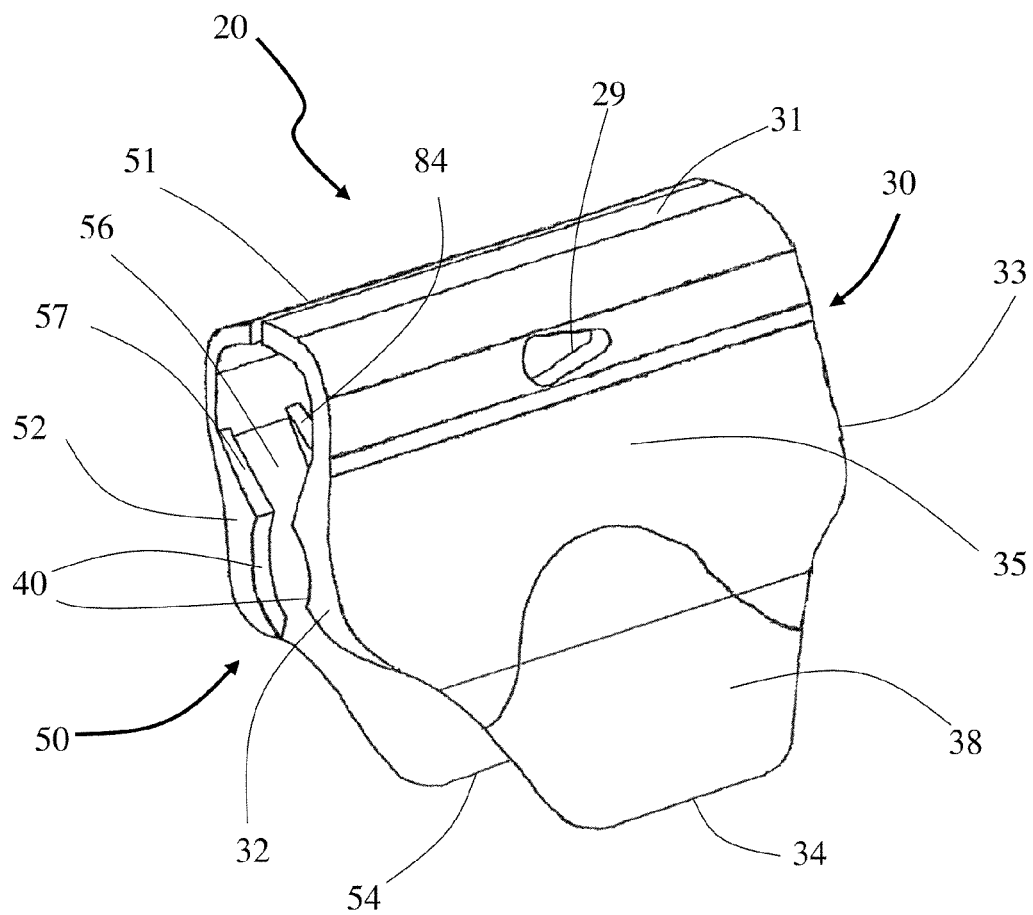
FIG. 8 is an enlarged perspective view of one embodiment of the present invention.

As shown in FIG. 8, first member 30 includes a single opening 29 for receiving at least the barb and point of the fishing hook. Second member 50 similarly includes a single opening 29. Second member 50 further includes at least one inner wall 84 positioned somewhere between the front sidewall 52 and the rear sidewall 53. The inner wall 84 protrudes substantially perpendicularly from inner surface 56 and extends substantially perpendicularly to the top sidewall 51. Although not pictured in FIG. 8, first member 30 further includes at least one inner wall 83 positioned somewhere between the front sidewall 32 and the rear sidewall 33. The inner wall 83 protrudes substantially perpendicularly from inner surface 36 and extends substantially perpendicularly to top sidewall 31. Also, inner walls 83 and 84 are substantially perpendicular to front and rear walls 32, 33, 52, and 53 at the position in the front and rear walls 32, 33, 52, and 53 where the notches 40 are positioned in the front and rear walls 32, 33, 52, and 53, respectively. Inner walls 83 and 84 will be described in more detail with reference to FIGS. 9 and 10.

Figure 9:
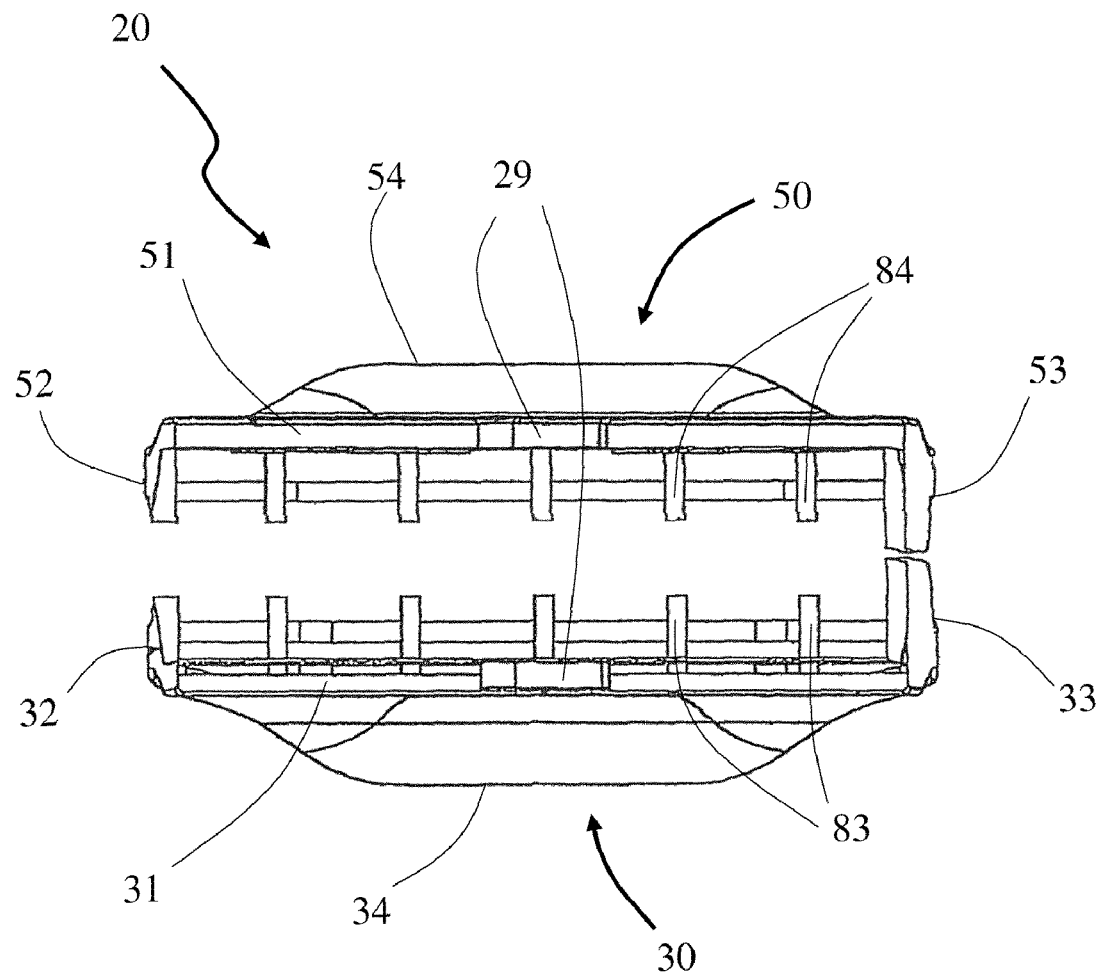
FIG. 9 is a top-side horizontal sectional exploded view.

As shown in FIG. 9, first and second members 30 and 50 further include a plurality of inner walls 83 and 84, respectively. Each of inner walls 83 aligns with a corresponding inner wall 84 along the longitudinal direction of the shaft 74.

Also, as shown in FIG. 10, each of the inner walls 84 on the inner surface 56 of the second member 50 further include a secondary notch 85. Although not shown, each of the inner walls 83 on the inner surface 36 of the first member 30 further include the secondary notch 85. The secondary notches 85 are positioned on the inner walls 84 to correspond with the position of the notches 40 on the front and rear sidewalls 32, 33, 52, and 53. Such an arrangement permits the secondary notches 85 to enhance the grip on the fishing pole 10 when the fishing hook retaining apparatus 20 grips the fishing pole 10. Moreover, the friction material 90 can be placed within the secondary notches 85 to further enhance the grip of the secondary notches 85 on the fishing pole 10.

The frictional material 90 is comprised of soft rubber or polymers and may be a continuous strip of material placed on and between all the secondary notches 85, as shown in FIG.

10. In contrast, the frictional material 90 may comprise individual strips of material that are placed solely within the secondary notches 85.

Figure 12:
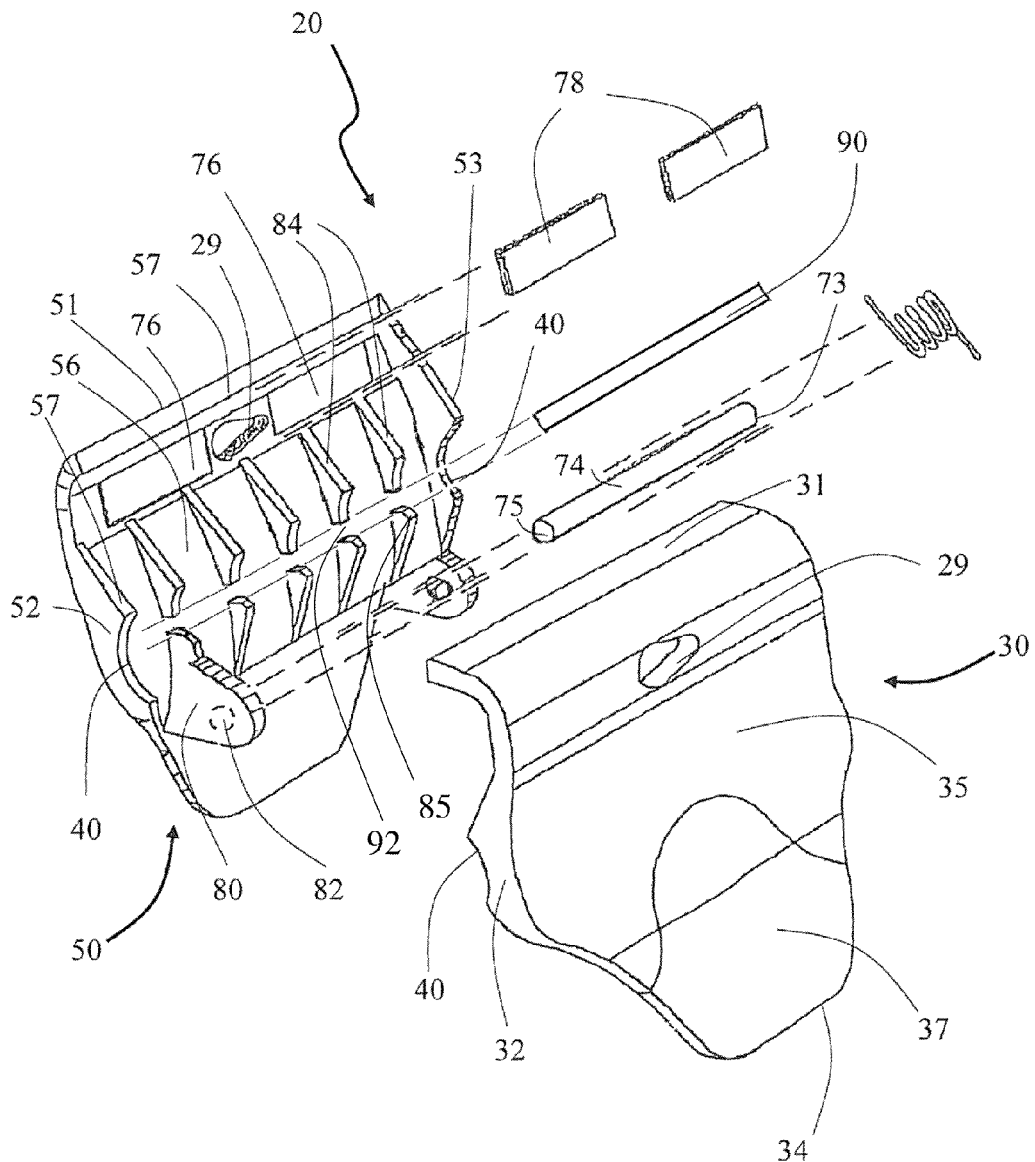
FIG. 12 is an exploded perspective view.

As shown in FIG. 12, the frictional material 90 may also be a single continuous strip of material placed along a groove 92 in each of the secondary notches 85 on each of the inner walls 83 and 84, wherein the groove 92 is positioned within each of the secondary notches 85. The grooves 92 in each of the secondary notches 85 in the inner walls 83 align with each other. Similarly, the grooves 92 in each of the secondary notches 85 in the inner walls 84 align with each other. With such a configuration, the single continuous strip of frictional material 90 may be placed along the inner surfaces 36 and 56 and within each of the grooves 92 as a straight continuous line. Also, the grooves 92 in the secondary notches 85 on the inner walls 83 align with the grooves 92 in the secondary notches 85 on the inner walls 84, such that the frictional material 90 placed on the inner surface 36 aligns with the frictional material 90 placed on the inner surface 56. When the frictional material is placed within the groove 92, the frictional material comes into contact with the cylindrical rod under the condition that the fishing hook retaining apparatus 20 is placed in the closed position. The groove 92 is structured such that when the frictional material 90 is placed within the groove 92, the top surface of the frictional material 90 is substantially flush with the surface of the secondary notches 85.

FIG. 10 further shows that inner depressions 76 may be arranged between the opening 29 in the second member 50 and the front and rear sidewalls 52 and 53, respectively. Although not shown, the inner depressions 76 may be arranged between the opening 29 in the first member 30 and the front and rear sidewalls 32 and 33, respectively. The magnets 78 may be placed within the inner depressions to fixedly secure the magnets 78 to the inner surfaces 36 and 56. Alternatively, for ease of use, the magnets 78 may be placed directly on the inner surfaces 36 and 56.

As shown in FIG. 10, the elastic member 70 may be a coil spring having a hollow center. The hollow center of the coil spring is slid over the cylindrical shaft 74, thus allowing the shaft 74 to retain the coil spring in the proper position. Further, as mentioned above, the elastic member 70 may comprise more than one coil spring, which may be slid over the cylindrical shaft 74. Retention protrusions extend substantially perpendicularly from the inner surfaces 36 and 56 and retain the coil springs in a position around the cylindrical shaft 74 in the longitudinal direction of the cylindrical shaft 74.

Figure 11:
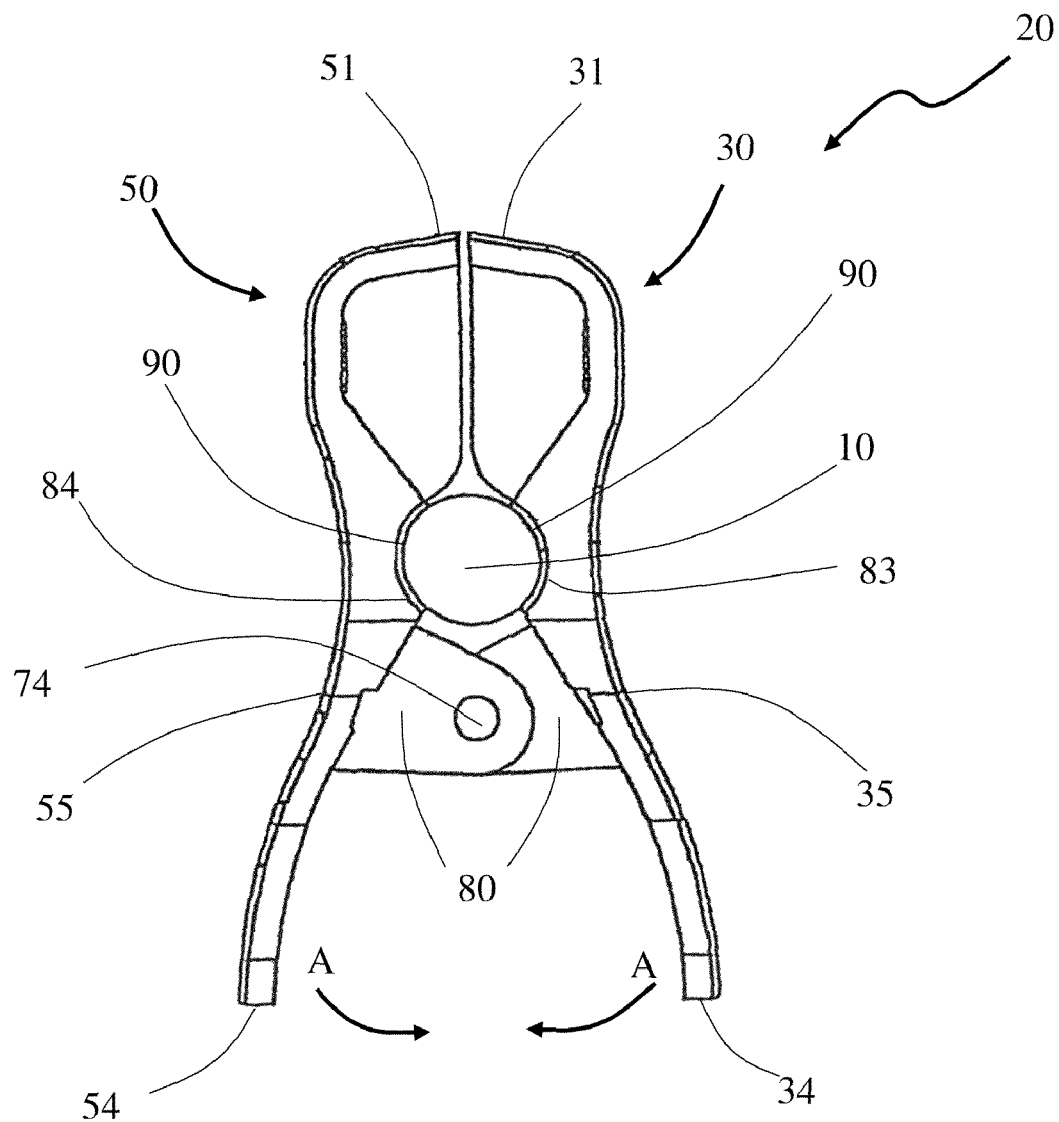
FIG. 11 is a vertical sectional view taken along line 6 in FIG. 1.

As shown in the cross-sectional view of FIG. 11, the cylindrical rod of fishing pole 10 is seen placed within the secondary notches 85 of each of the inner walls 83 of the first member 30 and the corresponding inner walls 84 of the second member 50. Between the secondary notches and the fishing pole 10 is the frictional material 90 that increases the grip of the fishing hook retaining device 20 on the fishing pole 10. FIG. 11 further shows directional arrows A, which indicate how the first and second members 30 and 50 pivotally rotate around the shaft 74 to move from the closed position to the open position when force is applied to the grip surfaces 37 and 57 of the first and second members 30 and 50, respectively.

The preferred materials for fabrication of the fishing hook retaining apparatus are of a commercially available type such as rigid plastics, fiberglass, wood, aluminum or metals.

The embodiments and examples set forth herein are presented in order to best explain the present invention and its practical application and to thereby enable those of ordinary skill in the art to make and use the invention. However, those of ordinary skill in the art will recognize that the foregoing description and examples are presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A retaining member for securing fishing tackle, the retaining member comprising:
    a main body defining a hollow interior; and
    coupling means for releasably coupling the retaining member to a fishing rod,
    wherein the hollow interior is configured to receive the fishing tackle,
    wherein the main body further comprises a first end and a second end, the first end being open and the second end being closed,
    wherein the coupling means further comprises an engagement member that pivots with respect to the main body between first second, and third positions, the engagement member being biased toward the first position, wherein pivoting the engagement member to the third position allows the retaining member to be coupled to or decoupled from the fishing rod and pivoting the engagement member to the second position secures the retaining member to the fishing rod, and
    wherein the coupling means further comprises a flange and a biasing member, the flange protruding from the main body, and the biasing member being positioned between the flange and the engagement member to bias the engagement member toward the first position.

2. The retaining member claim 1, wherein the coupling means further comprises a groove, the groove being defined in an exterior surface of the main body and being oriented axially along the main body, the groove being configured to receive the fishing rod therein.

3. The retaining member of claim 1, wherein the main body further comprises a slot, the slot being oriented axially along the main body, the slot being open at a first end of the main body and running a predetermined distance along the main body, the slot being configured to receive a shaft of a hook of the fishing tackle.

4. The retaining member of claim 1, further comprising an opening in the main body, the opening being positioned near the second end of the main body.

5. The retaining member of claim 1, the coupling means further comprising a groove defined by an exterior surface of the main body, wherein under the condition that the retaining member is secured to the fishing rod, the groove engages the fishing rod and the engagement member secures the fishing rod in the groove in the second position.

6. A retaining member for securing fishing tackle, the retaining member comprising:
    a main body defining a hollow interior, the main body having a first end and a second end, the first end being open and the second end being closed;
    an engagement member functionally coupled to the main body that pivots with respect to the main body between a closed position and an open position, the engagement member being configured to engage an exterior surface of the main body in the closed position;
    a flange extending from the exterior surface of the main body; and a biasing member, the biasing member being functionally configured between the flange and the engagement member to bias the engagement member toward the closed position.

7. The retaining member of claim 6, the retaining member further comprising:
a slot in the main body, the slot initiating from the first end and being open to the first end, the slot extending a distance down the main body toward the second end.

8. The retaining member of claim 6, the retaining member further comprising:
a groove defined in an exterior surface of the main body, wherein the groove is configured in the main body such that the engagement member covers a portion of the groove in the closed position.

9. The retaining member of claim 6, the retaining member further comprising:
an opening in the main body near the second end.

10. The retaining member of claim 6, wherein the main body is cylindrical and the main body further comprises a first portion and a second portion, wherein the first portion is proximate the first end and the second portion is proximate the second end, the first portion having a diameter larger than a diameter of the second portion.

11. The retaining member of claim 10, wherein an axial length of the engagement member corresponds to an axial length of the groove.

12. The retaining member of claim 10, wherein the slot is configured in the first portion and the groove is configured in the first and second portions.

13. The retaining member of claim 6, the engagement member further comprising:
an engagement portion; and
a gripping portion,
wherein the engagement portion is configured to functionally engage the exterior surface of the main body and cover a groove in the main body in the closed position, and
wherein the gripping portion is configured such that applying force to the gripping portion engages the biasing member to facilitate the transitioning of the engagement portion from the closed position to an open position.

14. A method of securing fishing tackle to a fishing rod, the method comprising:
providing a retaining member;
securing the retaining member to the fishing rod; and
placing the fishing tackle inside the retaining member,
wherein the placing the fishing tackle inside the retaining member further comprises;
inserting the fishing tackle in a hollow interior of the retaining member defined by a main body of the retaining member; and
inserting a shaft of a hook of the fishing tackle in a slot defined in the main body of the retaining member.

15. The method of claim 14, the securing the retaining member to the fishing rod further comprising:
transitioning an engagement member from a closed position to an open position, wherein in the closed position the engagement member engages an exterior surface of the retaining member and in the open position a groove in the exterior surface is revealed;
placing the fishing rod in the groove;
transitioning the engagement member from the open position to an engaged position, wherein in the engaged position the fishing rod is retained in the groove between the groove and the engagement member.

* * * * *